United States Patent [19]
Reuteler

[11] Patent Number: 5,979,147
[45] Date of Patent: Nov. 9, 1999

[54] ARTICLE GROUPING ASSEMBLY AND METHOD FOR A PACKAGING MACHINE

[75] Inventor: Urs Reuteler, Kennesaw, Ga.

[73] Assignee: Riverwood International Corporation, Atlanta, Ga.

[21] Appl. No.: 09/000,757

[22] Filed: Dec. 30, 1997

[51] Int. Cl.⁶ .................................................. B65B 35/30
[52] U.S. Cl. .......................... 53/448; 53/543; 198/419.2; 198/459.8
[58] Field of Search .......................... 53/48.7, 448, 531, 53/534, 543; 198/418.7, 419.2, 419.3, 459.2, 459.8, 461.2

[56] References Cited

U.S. PATENT DOCUMENTS

| | | |
|---|---|---|
| 1,689,247 | 10/1928 | Lange . |
| 2,007,981 | 7/1935 | Nordquist . |
| 2,744,608 | 5/1956 | Ardell et al. . |
| 2,827,998 | 3/1958 | Breeback . |
| 2,942,720 | 7/1960 | Fouse . |
| 3,254,470 | 6/1966 | Currie . |
| 3,521,737 | 7/1970 | Calvert . |
| 3,717,236 | 2/1973 | New . |
| 4,097,063 | 6/1978 | Calvert et al. . |
| 4,261,457 | 4/1981 | van Maanen . |
| 4,552,261 | 11/1985 | Raudat et al. . |
| 4,591,043 | 5/1986 | Muller . |
| 4,612,753 | 9/1986 | Taylor et al. . |
| 5,147,027 | 9/1992 | Craver . |
| 5,161,664 | 11/1992 | LeBras . |
| 5,501,064 | 3/1996 | Ingram et al. . |
| 5,577,365 | 11/1996 | Reuteler . |
| 5,638,665 | 6/1997 | Muller . |
| 5,664,401 | 9/1997 | Portrait et al. . |
| 5,669,203 | 9/1997 | Muller . |
| 5,699,651 | 12/1997 | Miller et al. . |

*Primary Examiner*—Daniel B. Moon

[57] ABSTRACT

A method is provided for selecting a predetermined number of articles from a plurality of articles and grouping the selected articles into an ordered group for delivery to an article packaging machine. The articles are moved at an infeed speed in series progressively along a path of travel and toward a pair of rotatable selector wheel assemblies located on opposite sides of the path. The articles are directed to the rotating selector wheel at a position where the velocity component of fingers attached to the wheel in the direction of the path of travel is equal to the infeed speed of the bottles. The fingers on the selector wheel engage selected ones of the bottles at this location and accelerate them smoothly and progressively to a machine speed that is greater than the infeed speed. The bottles are thus grouped together in separated groups and delivered to the packaging machine at the machine speed.

16 Claims, 6 Drawing Sheets

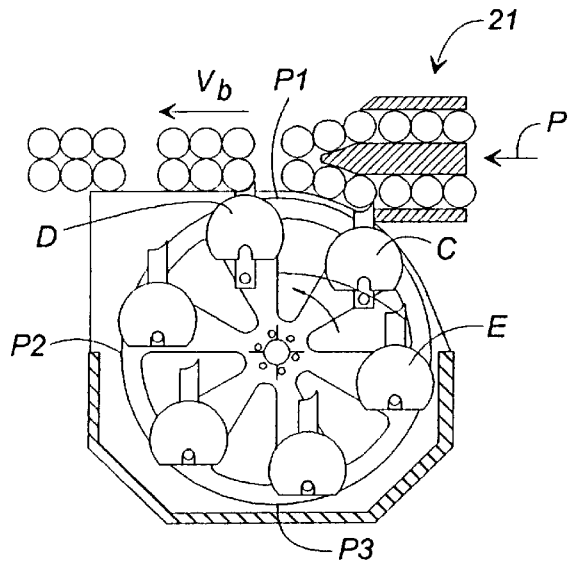
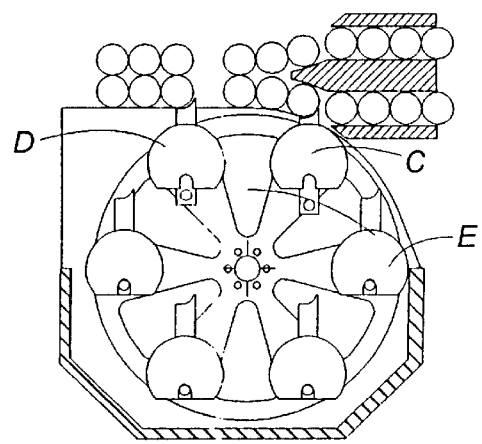
FIG. 5A  FIG. 5B
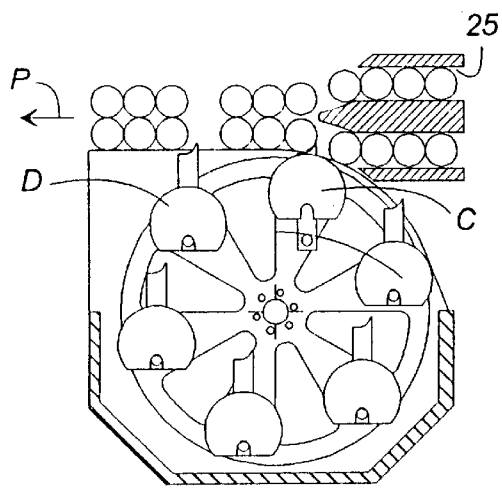
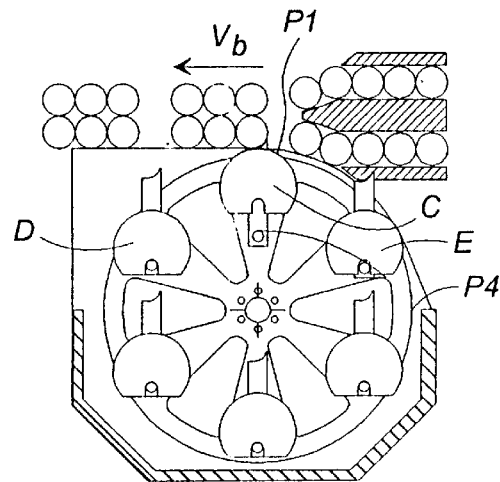
FIG. 5C  FIG. 5D

ARTICLE GROUPING ASSEMBLY AND METHOD FOR A PACKAGING MACHINE

FIELD OF THE INVENTION

This invention relates generally to article packaging machines, such as machines for packaging beverage bottles and cans, and more specifically to grouping and selector assemblies for selecting predetermined numbers of articles and grouping the selected articles into ordered groups for subsequent packaging into containers.

BACKGROUND OF THE INVENTION

Packaging machines for packaging articles such as beverage cans and beverage bottles into paperboard cartons are common in the packaging industry. In general, these machines include guides and conveyors that define a path of travel along which articles to be packaged are conveyed. As the articles are conveyed along the path, they are arranged into groups of a preselected number of articles, and the groups are inserted into or enclosed within a paperboard carton, which contains the article group for subsequent shipping and sale.

Most packaging machines include a selector and grouping assembly located at the upstream portion of the path, for selecting a predetermined number of articles from a queue of articles, and grouping the selected articles into an ordered group for delivery to downstream packaging stations of the packaging machine. A variety of such assemblies are known in the art. U.S. Pat. No. 4,093,063 of Calvert et al., for example, discloses an article grouping mechanism for a packaging machine in which the articles to be packaged, such as beverage bottles, are conveyed in side-by-side pairs along a path of travel. Rotating star wheels on opposite sides of the path receive and arrange the bottles in spaced apart continuous side-by-side linear arrays, and meter the infeed speed of the bottles as they leave the star wheels. As the bottles move beyond the star wheel assemblies, they pass between opposed endless chain conveyors having movable spacer elements mounted along the flights of the chain. The spacer elements move progressively between selected bottles to compact and arrange the bottles into groups of preselected numbers. The groups are then conveyed on to a downstream packaging station, where they are packaged in paperboard cartons.

U.S. Pat. No. 4,084,686 of Calhoun discloses a device for metering the flow of containers along a path, and for interrupting the flow in the case of, for example, a machine jam. The system of Calhoun includes a rotating star wheel having concave peripheral slots for receiving articles. As the articles move along their path of travel, they are received in respective slots of the star wheel, which carries the bottles around its perimeter toward the downstream end of the path. In the case of a machine jam, the star wheel is progressively braked by a torque motor to prevent a backup of bottles and to provide a continuous uninterrupted supply of bottles when the machine is restarted.

U.S. Pat. No. 5,161,664 of LeBras discloses an infeed grouping mechanism for a packaging machine. In this mechanism, articles to be grouped, such as bottles, are conveyed in a sequential linear array to a grouping mechanism. The grouping mechanism comprises an endless chain conveyor to which is attached an array of arcuate spacer elements. As the spacer elements round their endless chains at the upstream end of the path of travel, the spacer elements contact the sides of bottles moving along the path. A cam follower mechanism shifts a predetermined number of the spacer elements, and the associated bottles forwardly by a predetermined amount. This forms a group of bottles corresponding to the number of spacer elements that are shifted by the cam and cam follower mechanism. The groups are then conveyed on to downstream packaging stations of the packaging machine.

U.S. Pat. No. 4,552,261 of Raudat et al. discloses an article grouping device for a packaging machine comprising two chain conveyor systems mounted beneath the path of travel of articles through the packaging machine. The chain conveyor systems have two sets of grouper pins mounted on flight bars at a predetermined pitch so that the pins move upwardly between articles as the articles are fed through a common upper run of the chain conveyors. One chain conveyor is driven at a speed that varies sinusoidally, and is synchronized with the speed of the articles. The other chain conveyor is driven through a differential so that its pins move at a speed that varies oppositely to the first chain conveyor. In this way, preselected numbers of articles moving along the path are separated and arranged into groups for subsequent packaging at downstream stations of the packaging machine.

U.S. Pat. No. 4,591,043 of Miller discloses a mechanism for spacing and conveying articles in a packaging machine. The mechanism comprises a pair of endless chain conveyors disposed on either side of the path of travel of articles through the machine. Opposed arcuate spacer elements are mounted to the chains and, when facing each other across the path of travel, form compartments sized to contain articles conveyed along the path. As the articles move between the conveyors, they are sequentially received and contained within the compartments formed by the spacers. The compartments are arranged in groups of a predetermined number so that when the articles emerge from between the conveyors, they are arranged into corresponding groups.

While the devices of these patents represent article grouping mechanisms and processes that have potential for use in packaging machines, they nevertheless embody problems and shortcomings inherent in their respective designs. For example, endless chain conveyor systems with associated cam tracks and cam followers are inherently complex and require frequent adjustment and maintenance. In addition, changing components of chain conveyor systems for a different grouping configuration can be complicated and time consuming. Some of the devices of these patents require that the grouping assemblies be driven at nonconstant speeds, or that their speed be varied sinusoidally or in another fashion with time. Obviously controlling such movement is relatively complex, and requires differentials, variable drives, and other ancillary mechanisms for ensuring proper motion. Finally, many of these patents disclose engaging mechanisms that are fixed, and relatively rigid during the grouping process. This can lead to breakage of bottles and cans in situations where the bottles and cans become jammed and the spacers engage them at unintended locations. Such machine jams can lead to costly downtime during which the machines must be cleared and cleaned, and in many instances, the mechanisms realigned and resynchronized.

Accordingly, there exists a need for an article selector and grouping mechanism for use with a packaging machine that overcomes the problems of the prior art, that is simple and reliable in operation, that does not require complicated variable drive mechanisms, and that inherently avoids breakage of bottles and cans in the case of a machine jam. It is to the provision of such a selector and grouping mechanism that the present invention is primarily directed.

SUMMARY OF THE INVENTION

Briefly described, the present invention, in a preferred embodiment thereof, comprises an article grouping assembly usable, for example, with an article packaging machine for selecting a predetermined number of articles from side-by-side moving columns, and arranging or grouping the selected articles into ordered spaced apart groups for subsequent packaging. The articles to be grouped could comprise beverage bottles, and the invention will be described in terms of the grouping of beverage bottles. It should be understood, however, that the present invention is not limited to use with bottles, but also is applicable to grouping beverage cans and other articles as well.

The present invention can include a pair of opposed selector wheel assemblies disposed on either side of the path of travel or movement of bottles through the packaging machine, although only one assembly comprises one embodiment of the present invention. The selector wheel assembly has a drive wheel that is mounted for rotation about a substantially vertical axis, with the periphery of the drive wheel located adjacent to bottles moving along the path. A set of circumferentially spaced planetary carrier assemblies are rotatably mounted about the periphery of the drive wheel. Each of the planetary carrier assemblies is moved around with the drive wheel, and each in turn approaches and passes the path of bottle movement through the machine.

Each planetary carrier assembly is provided with a selector finger that projects from its carrier assembly toward the path of bottle movement. An eccentric ring is disposed beneath the drive wheel, and is coupled to the planetary carrier assemblies to maintain them in a fixed orientation with their selector fingers projecting toward the path of bottle travel as the assemblies are carried around by the rotating drive wheel. As the drive wheel rotates, each selector finger in turn progressively projects beyond the periphery of the drive wheel as its planetary carrier assembly approaches the path of bottle travel. The selector fingers are yieldably spring biased to their outwardly projecting positions. A cam and cam follower system retracts the selector fingers progressively inwardly as they approach and pass the path of travel so that the fingers do not project too far into the path.

In practice, the drive wheel is driven at a constant rate of rotation that is predetermined to move the selector fingers past the path of bottle travel at a desired machine speed. This speed matching occurs when the fingers and their carrier assemblies are aligned along a radius of the drive wheel that is perpendicular to the path of travel. Consequently each selector finger exhibits a velocity component in the direction of bottle travel that ranges from zero when the finger's planetary carrier assembly is aligned along a radius parallel to the path of travel, and which increases sinusoidally to the machine speed when the finger's carrier is aligned along a radius perpendicular to the path of travel.

A pair of opposed star wheels having scalloped peripheral edges are disposed on either side of the path of bottle travel upstream from the selector wheel assemblies. The star wheels function to meter the infeed speed at which bottles in side-by-side columns are conveyed to the selector wheel assemblies. The rate at which the star wheels are rotated is determined by the number of bottles to be included in each group of bottles. For groups of four bottles, "two-up" on each side for example, the infeed speed is relatively slow, and is predetermined to ensure that only every other bottle in each of the side-by-side columns is engaged by a selector finger of the selector wheel assembly. Similarly, for a group of six bottles, "three-up" on each side, the infeed speed is relatively faster to ensure that every third bottle is engaged by a selector finger. In all cases, the infeed speed is less than the machine speed.

As each of the selector fingers moves toward the path of bottle movement, there is an angular location on the drive wheel where the velocity component of the finger in the direction of bottle travel is equal to the infeed speed of bottles being conveyed to the selector wheel assemblies by the star wheels. It therefore is desirable that the selector fingers engage and select bottles at this position so that discontinuous forces or jolts are not conveyed to the bottles when they are engaged by the selector fingers. To accomplish this, a pair of guides and a centrally positioned guide spacer may be disposed between the star wheels and the selector wheel assemblies. The guides and guide spacer together define selector infeed guide paths for each column of bottles that direct the bottles in each column toward the position on the rotating selector wheel assembly where the velocity component of the selector fingers in the direction of bottle travel matches the infeed speed of the bottles. Thus, the bottles are engaged by the selector fingers in a smoothly engaging manner.

Once a selected bottle is engaged, it and the selected, for example, two or three, bottles in front of it are progressively accelerated by the selector finger on around the periphery of the selector wheel assembly until the bottles are moving at the machine speed when the selector finger passes perpendicular to the path of travel. In the method, the selected group of bottles become spaced from trailing bottles in the queue, forming properly spaced groups of articles that are conveyed to downstream packaging stations of the packaging machine. When it is desired to change the grouping configuration, an operator need only change the rate at which the star wheels are driven to increase or decrease the infeed speed of the bottles and in some instances, change the guides and guide spacer to present the bottles to the selector wheel assembly at the proper location where the speed of the selector fingers in the direction of bottle travel matches the infeed speed of the bottles.

Thus, it will be seen that the grouping and selector wheel assembly and method of the present invention are simpler and easier to maintain than endless chain conveyor systems of the prior art. In addition, the drive wheels of the selector wheel assemblies need only be rotated at a constant rate of speed rather than a varying rate of speed, as is required by some prior art selector assemblies. Finally, since the bottles are engaged by the selector fingers at a point where the velocity component of the fingers in the direction of the path of travel matches the infeed speed of the bottles, the selected bottles are engaged smoothly by the fingers, and are accelerated progressively from their infeed speed to the machine speed, which is greater than the infeed speed. This reduces bottle breakage and machine jams due to rough or discontinuous handling of the bottles.

Accordingly, it is an object of the present invention to provide an article grouping assembly and method that is mechanically more reliable than endless chain assemblies of the prior art.

Another object of the invention is to provide an article grouping assembly and method that does not require components to be driven at variable rates of speed.

A further object of the invention is to provide a grouping assembly and method that smoothly accelerates selected groups of articles from a first rate of speed to a second rate of speed greater than the first rate of speed to minimizing breakage and jams.

An additional object of the invention is to provide an article grouping assembly and method that can easily be adapted to group articles into groups of different numbers by interchanging a minimum number of components.

These and other objects, features, and advantages of the present invention will become more apparent upon review of the detailed description set forth below taken in conjunction with the accompanying drawings, which are briefly described as follows.

BRIEF DESCRIPTION OF THE DRAWINGS

FIGS. 5A through 5D are schematic plan views of the present invention illustrating sequential operation of the assembly for selecting and grouping articles.

DETAILED DESCRIPTION OF THE PREFERRED EMBODIMENTS

Figure 1:
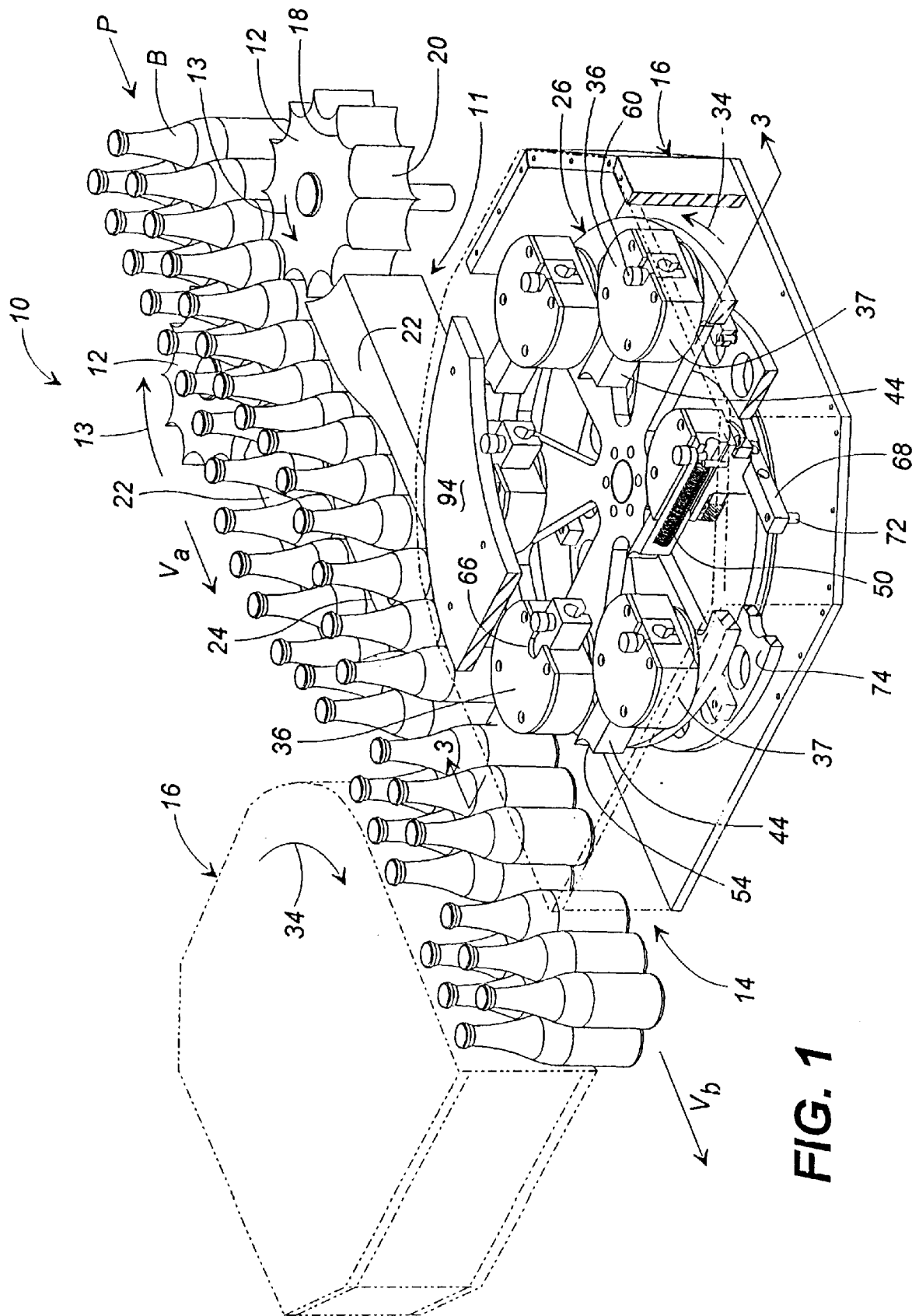
FIG. 1 is a perspective partially sectioned view of an article grouping assembly that embodies principles of the present invention in a preferred form.

Referring now in more detail to the drawings, in which like numerals refer to like parts throughout the several views, FIG. 1 illustrates an article grouping assembly for a packaging machine that embodies principles of the present invention in a preferred form. Articles to be grouped, in this case, beverage bottles B, are conveyed by a conveyor system such as a moving belt, toward the grouping assembly in two parallel columns. A pair of rotatable star wheels 12 are disposed on either side of the column of bottles and are rotated by a suitable drive means (not shown). Each of the star wheels 12 has a periphery 18 that is scalloped to form concave recesses 20 that are sized to conform to the outer dimensions of the bottles B where the bottles are to be contacted.

As the star wheels 12 are rotated in the direction of arrows 13, the bottles B are sequentially received and restrained within the concave recesses 20 of the star wheels 12. This functions to align the bottles in side-by-side pairs as they move along the path of travel P, and also meters or holds back the line pressure imparted to the bottles by the infeed system, such as sliding surface conveyor system (not shown), which conveys the bottles from a holding area toward the grouping assembly. Other bottle conveying infeed systems which deliver bottles to the starwheels will function with the apparatus and method of the present invention. The rate at which the star wheels 12 are rotated meters the rate at which the bottles move beyond the star wheels, so that they progress beyond the star wheels at a first rate of speed or infeed speed $V_a$. Thus, the star wheels function to align the bottles B in side-by-side paired columns, and deliver them at an infeed speed $V_a$ toward the downstream end of the grouping assembly.

As the aligned and metered columns of bottles B move beyond the star wheels 12, they are directed by a guide assembly 21, which includes a pair of upstanding guides 22 disposed on either side of the path of travel, and an upstanding guide insert 24 disposed between the guides 22. The guides 22 and guide insert 24 define a pair of guide channels 25 through which the bottles move toward the downstream end of the grouping assembly.

A pair of selector wheel assemblies 16 are disposed on either side of the path of travel P of the bottles downstream of the star wheels, so that the bottles move between the selector wheel assemblies as they are conveyed along their path of travel. While only one of the selector wheel assemblies 16 is shown in detail in FIG. 1, it will be understood that the opposing selector wheel assembly is a structural mirror image thereof, and functions essentially in the same way as the assembly discussed, except as to the rotational direction of the drive wheel, as set forth herein.

In general, each of the selector wheel assemblies 16 comprises a rotatable drive wheel 26 having a set of circumferentially spaced planetary carrier assemblies 36 mounted about the periphery thereof. As described in more detail below, each of the planetary carrier assemblies 36 comprises a housing 37 that is rotatably mounted to the drive wheel 26. A selector finger 44 having a contoured end 54 projects from the housing of each of the planetary carrier assemblies 36 toward the path of travel P of the bottles B. Each selector finger 44 is spring biased to its outwardly projecting position relative to its planetary carrier assembly by a coil spring 50 disposed within a slotted bore formed in the finger.

A cam follower 60 is mounted to the back end of each selector finger 44, and projects upwardly therefrom. Each of the cam followers 60 is received in a slot or recess 66 formed in the top cover 62 (FIG. 2) of the planetary carrier 36, to limit the extent of outward projection of the selector finger 44 from the planetary carrier assembly 36. It will thus be seen that each of the selector fingers 44 can be depressed or retracted into its carrier assembly 36 against the bias of its coil spring, as illustrated in FIG. 1. As described in more detail below, a cam plate 94 is mounted to the selector wheel assembly, and is configured to engage the cam followers 60 as the planetary carrier assemblies 36 rotate around the drive wheel to retract the selector fingers 44 in a predetermined way as they engage and accelerate bottles.

An eccentric ring 74 is rotatably mounted beneath the drive wheel 26, and is positioned to rotate about an axis that is offset from the axis of rotation of the drive wheel 26. An arm 68 is secured to each of the planetary carrier assemblies 36 beneath the drive wheel 26. Each arm 68 is provided with a downwardly projecting pin 72 that is rotatably received within a bore in the eccentric ring 72. This arrangement allows the eccentric ring 74 to be pulled around by the pins 72 as the drive wheel 26 is rotated, and the cooperation of the eccentric ring 74 with the arms 68 functions to maintain the planetary carrier assemblies 36 in a fixed orientation relative to the path of travel of the bottles. As a result, the selector fingers 44 are maintained in a fixed orientation projecting toward the path of travel of the bottles at all times, as their planetary carrier assemblies are rotated around with the drive wheel 26.

In practice, the drive wheel 26 is rotated in a counter-clockwise direction of rotation by a suitable drive mechanism, such as a servo motor, (not shown) in the direction of arrow 34. It should be obvious that the drive wheel of the opposing article grouping assembly is rotated in a clockwise direction in order to move their associated selector fingers in the direction of path P. All other structural and functional aspects of the opposing article grouping assemblies are identical. The rate of rotation of the drive wheels 26 is predetermined to insure that when each of the planetary carrier assemblies 36 passes the path of travel of the bottles and is aligned along a drive wheel radius perpendicular thereto, the planetary carrier and its selector finger have a velocity component in the direction of the path of travel that is substantially equal to a desired machine speed $V_b$. The machine speed $V_b$ is the speed at which the groups of bottles are to be conveyed to downstream stations of the packaging machine for further processing.

Thus, it can be seen from FIG. 1 that as the selector wheel assemblies 16 are rotated, the selector fingers 44 are moved sequentially into engagement with selected ones of the bottles B. As the selector wheel 26 continues to rotate, the fingers urge the bottles down the path of travel while at the same time accelerating them from their infeed speed $V_a$ to the machine speed $V_b$. The effect of this acceleration is to segregate the bottles into spaced groups of a predetermined number. These groups are then carried by any suitable, well known conveyor (not shown) to downstream packaging stations of the packaging machine to be enclosed within cartons.

Figure 2:
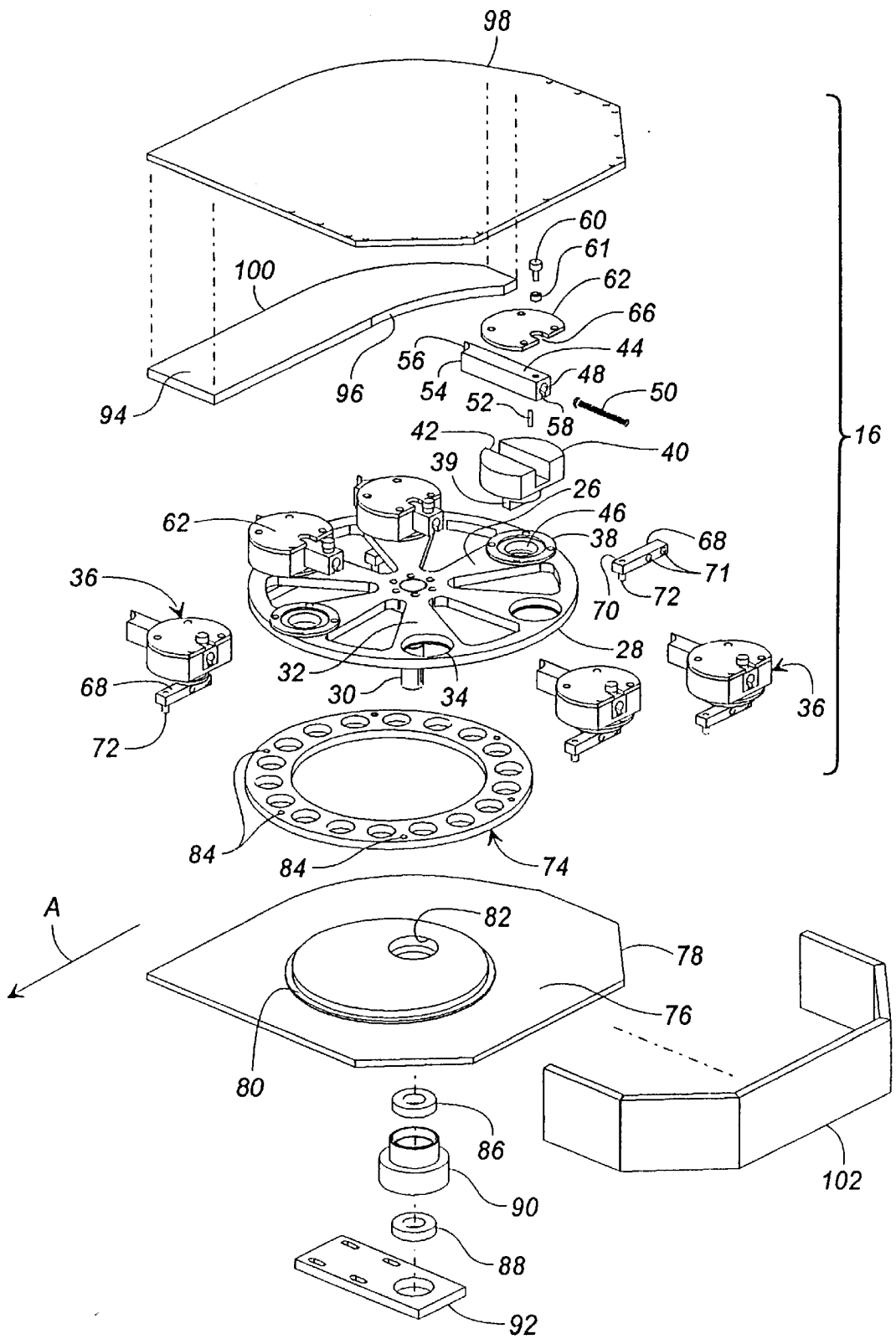
FIG. 2 is an exploded view of the selector wheel assembly of FIG. 1.

FIG. 2 is a more detailed, exploded view of one of the selector wheel assemblies 16, illustrating the interconnection and function of the various components thereof. The drive wheel 26 of the assembly 16 is provided with a downwardly projecting drive shaft 30 that is received through an opening 82 formed in a bottom cover 78. The drive shaft 30 is rotatably supported in the bottom plate 78 by a pair of bearings 86 and 88 that, in turn, are secured within a bearing sleeve 90 that fits and is secured within the opening 82 of the bottom cover 78. A machine mount 92 is secured to the bearing assembly and, in turn, is itself secured to the frame of the packaging machine (not shown) for securing the entire assembly 16 to the machine. A suitable drive, such as a servo motor mechanism (not shown) is coupled to the drive shaft 30 beneath the bottom plate 78 for driving the drive wheel 26 at a predetermined rate of rotation.

A disc-shaped bearing plate 76 having an annular collar or shoulder 80 formed about its periphery is secured to the bottom cover 78, and is eccentrically positioned relative to the opening 82. The bearing plate 76 also is formed with an opening that aligns with the opening 82 so that the drive shaft 30 of the drive wheel 26 extends through the bearing plate 76 and through the bottom cover 78. An eccentric ring 74 is provided with circumferentially spaced holes 84, and also defines a central opening that is sized to fit slidably within the annular shoulder 80 formed in the bearing plate 76. Preferably, the bearing plate 76 and the eccentric ring 74 are made of a low friction material so that the ring 74 can rotate relatively freely while sliding around within the annular collar 80 of the bearing plate 76. This arrangement permits the ring 74 to be rotated about an axis that is spaced from the axis of rotation of the drive wheel 26. Accordingly, the ring 74 rotates about an eccentric path relative to the rotation of the drive wheel 26.

In the preferred embodiment, the drive wheel 26 is formed with an array of radially projecting webs 32 that extend from the center of the drive wheel to its periphery 28. An array of circumferentially spaced circular openings 34 are formed about the periphery of the drive wheel 26. Each opening 34 is sized to receive a bearing 46 and a bearing plate 38 that are appropriately secured to the drive wheel by means of bolts or other fasteners. The bearing plates 38 and bearings 46 form mounting assemblies for rotatably receiving the planetary carrier assemblies 36 as described in more detail below.

Each of the planetary carrier assemblies 36 comprises a block 40 formed with a generally rectangular slot 42 extending diametrically therethrough. A mounting shaft 39 projects axially downwardly from each of the blocks 40 and is dimensioned to be rotatably received within one of the bearing sleeves 46 mounted to the drive wheel 26. When so disposed, the block 40 is free to rotate within the bearing sleeve 46 with the bottom of the block sliding on the surface of the bearing plate 38.

The lower end of each mounting shaft 39 is faced to receive an alignment arm 68. The alignment arm 68 preferably is mounted to the shaft 39 by means of bolts extending through holes 71 and into the faced end of the shaft 39. When so mounted, the alignment arm projects horizontally from the end of the shaft 39 to a distal end 70. A downwardly projecting pin 72 is mounted adjacent to the distal end 70 of the alignment arm 68. As best illustrated in FIG. 1, the pin 72 of each alignment arm 68 is sized and positioned to be received in a respective hole 84 in the eccentric ring 74 beneath the drive wheel 26. As the drive wheel 26 is rotated, the pins 72 pull the eccentric ring 74 around its axis of rotation and, in turn, the eccentric ring 74 and alignment arms maintain the planetary carrier assemblies 36 in a fixed orientation relative to the path of travel of bottles moving through the machine with slot 42 aligned normal to path P.

A generally rectangular selector finger 44 is sized and configured to be slidably received within the slot 42 of each block 40. Each selector finger 44 has a distal end 54 that is curved or otherwise contoured to conform at least partially to the shape of bottles or other articles to be grouped. A slotted bore 48 is formed through the back end of the selector finger 44 and extends longitudinally a predetermined distance into the selector finger 44. The slotted bore 48 is sized to receive a tension mechanism such as coil spring 50. A spring retaining pin 52 is mounted in and projects upwardly from the floor of the slot 42 into the bore 48 behind the spring 50 to retain the spring in place and provide a stop against which the spring can be compressed.

A cover plate 62 is secured to the top of each block 40 and functions to retain the selector finger 44 in place within the slot 42. The cover plate 62 is formed with a recess along its back edge aligned with the selector finger 44. A cam follower 60 is mounted through a spacer 61 to the back end portion of the selector finger 44, and projects upwardly therefrom. The spacer 61 is sized to be received in the slot 66 when the selector finger 44 is biased by its coil spring 50 to its fully projecting position relative to its planetary carrier assembly 36. The cam follower 60 projects above the cover plate 62 a predetermined distance.

A cam plate 94 has a contoured outside edge 100 and a contoured inside edge 96 that forms a cam surface for engaging the cam followers 60 of the planetary carrier assemblies 36. As described in more detail below, the cam followers 60 engage the cam surface 96 as the carrier assemblies are rotated around with the drive wheel 26 to retract the selector fingers 44 in a predetermined way for engaging bottles and accelerating them along their path of travel.

A top cover 98 and a side panel 102 enclose the moving components of the selector wheel assembly 16 to protect them from dirt and debris, and to enclose the moving elements.

Figure 3:
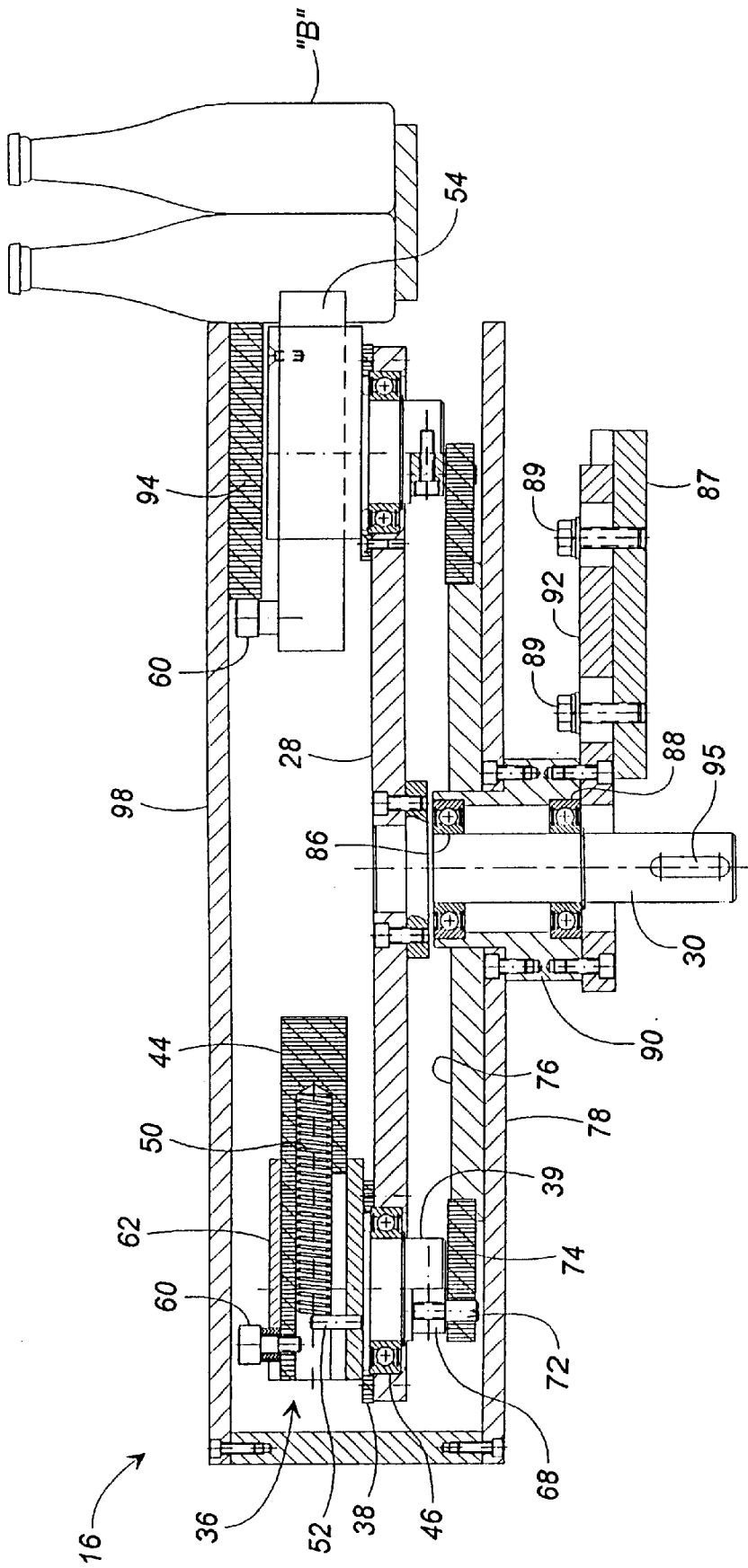
FIG. 3 is a lateral sectional view of one of the selector wheel assemblies taken along lines 3—3 of FIG. 1.

FIG. 3 is a sectional view of the selector wheel assembly 16 taken along line 3—3 of FIG. 1, and illustrates a side view of various components thereof. As described above, the assembly 16 includes a bottom plate 78 to which is mounted an eccentric bearing plate 76 having a peripheral shoulder within which an eccentric ring 74 rotatably rests. The drive wheel 28 has an axially extending drive shaft 30 that extends through the eccentric bearing plate 76 and bottom cover 78, where it is mounted within bearings, such as ball bearings 86 and 88. The bearings 86 and 88 are, in turn, mounted within the bearing flange 90, which is secured to the bottom plate 78. The entire assembly is mounted to the machine frame 87 by means of bolts 89 extending through the machine mount 92, which, in turn, is secured to the bearing flange 90. The lower end of the drive shaft 30 is provided with a key way 95 or other appropriate means for coupling the drive shaft to an appropriate drive mechanism, such as a servo motor (not shown) for rotating the drive wheel 28 at a desired rate of rotation.

Each of the planetary carrier assemblies 36 has a downwardly projecting shaft 39 that extends through bearings 46 mounted in the openings formed in the drive wheel 28. The planetary carrier assemblies 36 rest atop respective bearing plates 38, also mounted to the drive wheel 28. This arrangement permits the carrier assemblies to be rotatably mounted to the drive wheel 28. Alignment arms 68 are mounted to the lower ends of shafts 39, and include downwardly projecting pins 72 that extend rotatably into openings 84 formed in the eccentric ring 74 to maintain the carrier assemblies 36 in a fixed orientation as the drive wheel is rotated.

The selector finger 44 of each planetary carrier assembly is biased to an outwardly projecting position by a coil spring 50 disposed within a longitudinally extending slotted bore in the selector finger. The coil spring 50 is captured between the end of the bore and a pin 52, which constrains the coil spring and provides a stop against which it can be compressed. Cam followers 60 project upwardly from the back end of each selector finger 44, and are positioned to engage and ride against the cam surface of the cam plate 94 as the carrier assemblies approach and move past the path of travel of bottles B. The cam surface of the cam plate 94 is configured to maintain the distal ends 54 of selector fingers 44 in contact with the bottles B as the ends 54 push the bottles and accelerate them to machine speed.

An additional advantage of the cam follower and cam plate arrangement of this invention is that, in the event of a machine jam, the fingers 44 are easily pushed back against the bias of their coil springs as they engage jammed bottles, to avoid breaking the bottles and exacerbating the jam.

Figure 4A:
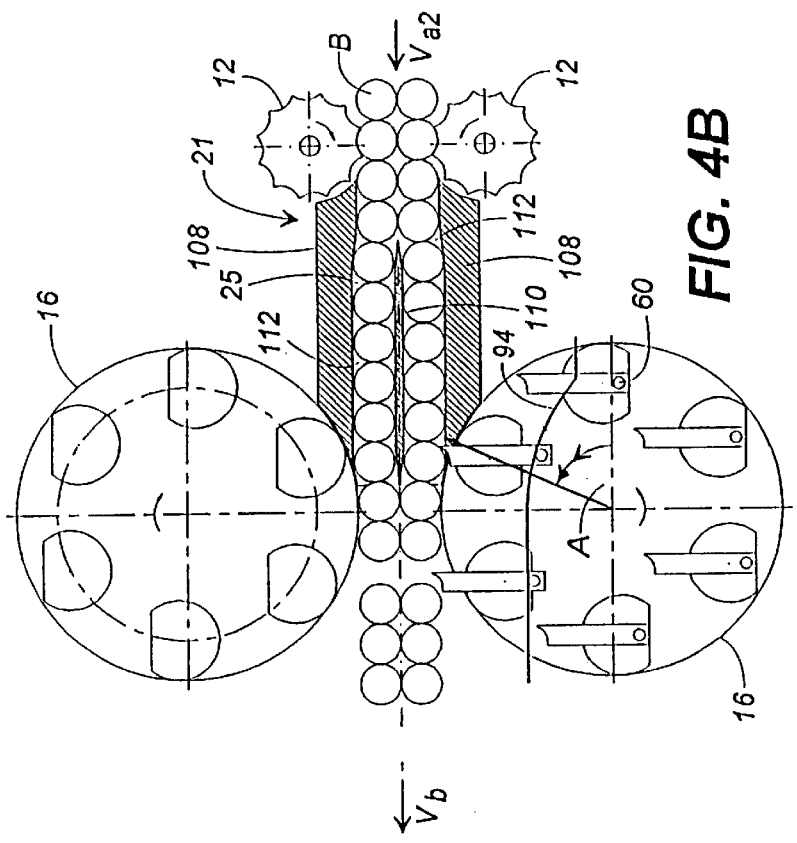
FIG. 4A is a schematic plan view illustrating an embodiment of the present invention for arranging articles in groups of four articles, or a "two up" configuration.
Figure 4B:
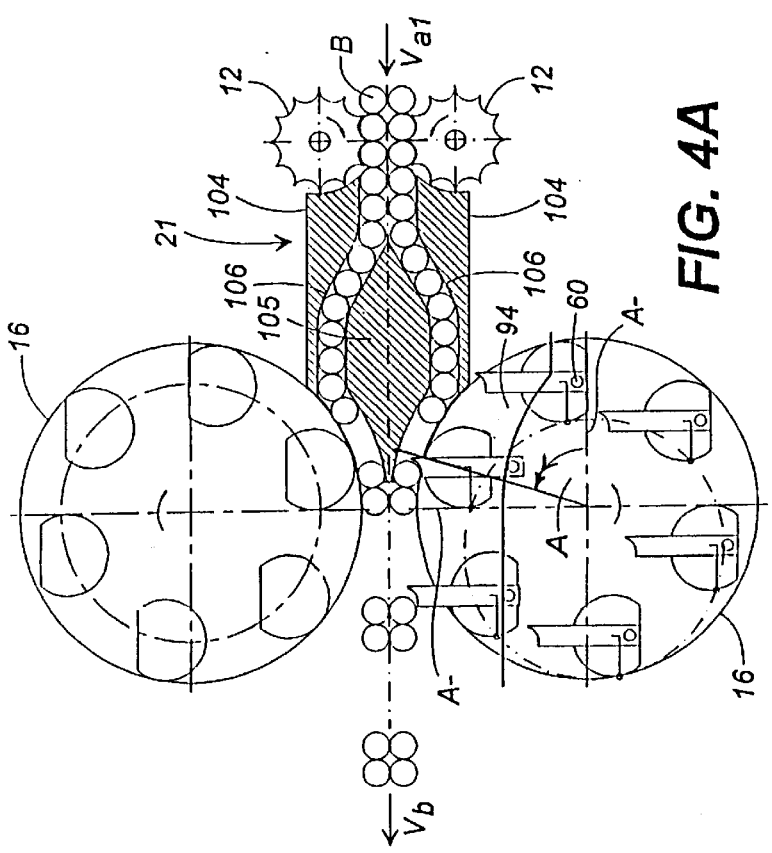
FIG. 4B is a schematic plan view of the present invention illustrating an embodiment for arranging articles in groups of six articles, or a "three up" configuration.
Figure 4C:
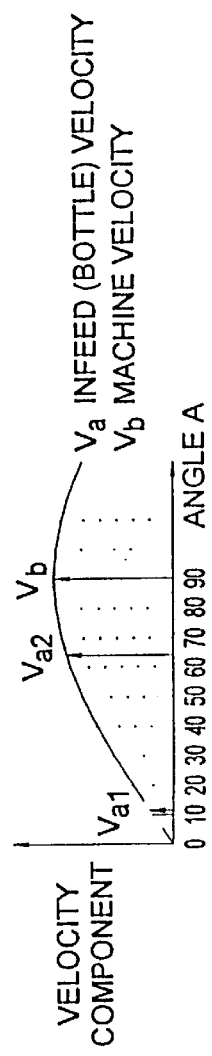
FIG. 4C is a graph that illustrates the velocity component of the selector fingers in the direction of the path of travel as the fingers are moved toward the articles, and also illustrates selection of the circumferential position on the drive wheel where articles are to be introduced to the selector wheel for various grouping configurations.

FIG. 4A, in conjunction with the graph of FIG. 4C, illustrates operation of the grouping assembly of this invention to group bottles B into "two up" groups comprising four bottles in each group. Similarly, FIG. 4B in conjunction with FIG. 4C illustrates operation of the invention for grouping bottles into "three up" groups comprising six bottles in each group. FIG. 4C is a graph of the velocity component in the direction of the path of bottle travel of one of the planetary carrier assemblies and its selector finger as a function of the angle A at which the assembly is located. In this graph, a 0° angle A-1 represents the planetary carrier assembly aligned along a radius parallel to the path of bottle travel, as illustrated in FIG. 4A. An angle A-2 of 90° corresponds to the planetary carrier assembly being aligned along a radius of the drive wheel perpendicular to the path of travel of the bottles. The planetary carrier assembly reaches the 90° angle just as it passes the path of travel and begins to move back around with the rotating drive wheel.

As illustrated in FIG. 4C, the velocity component of a planetary carrier assembly, and consequently of its selector finger, is zero with the angle A is zero (A-1). As the carrier assembly is rotated progressively around toward the path of travel, its velocity component in the direction of the path of travel increases sinusoidally to a maximum of $V_b$ at an angle A of 90° (A-2). As the carrier passes 90° and begins to move back around the drive wheel, its velocity component in the direction of the path of travel begins to decrease sinusoidally until it again reaches 0 at an angle A of 180°. These velocity component characteristics are repeated for each of the planetary carriers and their selector fingers as the drive wheel continues to rotate. In practice, the drive wheel is driven at a rate of rotation that is predetermined to insure that the maximum velocity $V_b$ is equal to the machine speed at which it is desired to deliver groups of bottles to subsequent packaging stations of the machine.

In FIG. 4A, it is desired to group the articles into groups of four comprising two pairs of side-by-side bottles. In order to accomplish this, the rate of rotation of the star wheels 12 is predetermined to deliver bottles to the selector wheel assemblies at an infeed speed $V_{a1}$ such that only every other bottle is engaged by a selector finger of the selector wheel assembly. Thus, the infeed speed or first rate of speed of the bottles is predetermined by the number of bottles to be included in each group of bottles selected by the grouping assembly. It will be appreciated by those of skill in the art that for the "two up" grouping configuration of FIG. 4A, the infeed speed $V_{a1}$ is relatively slow compared to the machine speed $V_b$. Similarly, for the "three up" grouping of FIG. 4B, the infeed speed $V_{a2}$ (FIG. 4B) is relatively fast compared to the machine speed $V_b$ to ensure that only every third bottle is to be engaged by a selector finger.

As mentioned above, it is desirable that selected bottles be engaged by the selector fingers at a location where the velocity component of the fingers in the direction of the path of travel of the bottles is equal to the infeed speed of the bottles. In this way, the bottles are engaged by the selector fingers and accelerated smoothly from their infeed speed to the machine speed. In order to accomplish this, the bottles must be presented to the drive wheel at the angle A where the velocity component of the finger in the direction of the path of travel is equal to the infeed speed of the bottles. Referring to FIG. 4C, it will be seen, for the grouping configuration of FIG. 4A, this condition occurs at a relatively low angle A on the drive wheel as indicated by the vertical arrow labeled $V_{a1}$. By comparison, for the grouping configuration of FIG. 4B, the infeed speed is matched at a relatively high angle A on the drive wheel, as illustrated by the vertical arrow labeled $V_{a2}$ in FIG. 4C.

For the grouping configuration of FIG. 4A, the bottles must be presented to the selector wheel assembly farther up around the assembly than for the configuration of FIG. 4B. In order to accomplish this, the guides 104 and guide insert 105 are sized and configured to form guide paths that divert bottles in each column toward the proper position on the respective selector wheel assembly. In the case of FIG. 4A, the bottles in each column are diverted a relatively larger distance from the center of the path of travel to be presented to the selector wheel at the proper angle A. The bottles are thus selected by the fingers and accelerated smoothly from their infeed speed to the machine speed at the position where the angle A is 90°. At the same time, the selected group of bottles are accelerated away from the trailing queue of bottles so that they are formed into spaced apart groups with the desired number of bottles in each group. The grouped bottles are then delivered by a conveyor (not shown), also driven at machine speed, to convey the groups of bottles to subsequent packaging stations of the packaging machine.

By comparison, FIG. 4B illustrates operation of the present invention to group bottles B into groups of six bottles arranged in three side-by-side pairs. In this embodiment, the rate of rotation of star wheels 12 is determined to insure that every third bottle in the queue is engaged by a selector finger as the selector wheel assembly 16 is rotated. It will thus be appreciated that the infeed speed $V_{a2}$ in 4B is larger than the infeed speed $V_{a1}$ in the case of FIG. 4A.

Referring to FIG. 4C, it will be seen that the velocity component of the fingers in the direction of the path of travel for the configuration of FIG. 4B is equal to the infeed speed $V_{a2}$ at a relatively larger angle A on the drive wheel. Accordingly, the bottles must be presented to the drive wheel at this location rather than a location further around the wheel as for the configuration of FIG. 4A. To accomplish this, the guides 108 and guide insert 110 are sized and configured to form guide paths that divert the bottles by an amount predetermined to ensure that the bottles are presented to the rotating selector wheels at the proper angle A. Since this angle is substantially larger than with FIG. 4A, the bottles only need to be diverted a smaller distance away from their original parallel paths.

The infeed speed $V_{a2}$ is metered by the star wheels so that as every third bottle reaches the proper angle A on the selector wheel assembly, a selector finger engages the bottle at a speed that matches its infeed velocity $V_{a2}$ and accelerates it smoothly toward the machine speed at an angle A of 90°. The bottles are thus selected in groups of six and accelerated to machine speed and each group is spaced from the trailing group so that it can be packaged at subsequent stations of the machine.

FIGS. 4A and 4B also illustrate the function of the cam surface 94 and cam followers 60. As the planetary carrier assemblies move from an angle of 0° toward the bottles, the contoured ends of the selector fingers begin to project from the periphery of the selector wheel assembly. It is not desirable for the ends of the fingers to project too far, since this condition might cause bottle breakage and jams. Thus, when the projection of the ends of each selector finger is ideal, the cam follower 60 of the selector finger engages the cam surface 94. As the selector wheel continues to rotate, the cam follower 60 rides along the cam surface 94 and retracts the selector finger progressively backward against the bias of its coil spring. The configuration of the cam surface 94 is predetermined so that the projection of the end of the selector finger remains ideal as the finger moves from its 0° position to its 90° position.

Beyond the 90° position, the cam surface is parallel to the path of travel of the bottles. Thus, as each planetary carrier assembly moves beyond the 90° position and back up around the drive wheel, the end of its selector finger continues to move along with its selected group of bottles until the finger is fully extended, whereupon it is drawn away from the bottles in preparation for the next operation cycle.

With the foregoing configuration, it will be appreciated that the drive wheels of the present invention are rotated at a constant rate of rotation, which simplifies operation of the grouping assembly. Despite the constant rate of rotation of the drive wheels, the selector fingers of the assembly engage the moving bottles at the infeed speed at which they are metered by the star wheels and accelerates selected bottles smoothly to the machine speed. This is a process of greatly improved efficiency over prior art endless chain type selectors and does not require complicated drive mechanisms for driving various components at varying rates of speed.

FIGS. 5A through 5D illustrate sequential operation of the selector wheel assemblies of the present invention. In FIG. 5A, the selector finger of the planetary carrier assembly C located at approximately 2 o'clock on the drive wheel is seen just as it engages the third bottle of a group of bottles moving along a path of travel. As detailed above, the engagement occurs at an angle where the velocity component of the selector finger in the direction of the path of travel is the same as the infeed speed of the bottle. Thus, the bottle is engaged gingerly so that abrupt or discontinuous forces that might break the bottle are not imparted.

In FIG. 5B, the selector wheel assembly and planetary carrier assembly C have rotated a bit further, and the selected group of bottles are beginning to be accelerated away from the trailing queue of bottles. It will also be seen in FIG. 5B that the selector finger of assembly C is being retracted by virtue of its cam follower riding on the cam surface. In this way, the selector finger maintains the proper projection, and thus maintains its ginger engagement with the selected bottle. The adjacent leading planetary carrier assembly D in FIG. 5B is seen moving its selected group of bottles beyond the 90° position for delivery to subsequent stations of the packaging machine. In this position, the planetary carrier assembly D is beginning to move back up around the drive wheel and its cam follower, riding on the cam surface, is allowing the selector finger to extend progressively to maintain its contact with the bottles for a short distance beyond the 90° position of carrier D.

In FIG. 5C, the planetary carrier assembly C is approaching its 90° position, and has accelerated its selected group of bottles further from the trailing queue of bottles. The carrier assembly D has moved its finger out of engagement with its selected group of bottles and this group is being conveyed by a conveyor (not shown) toward the packaging station at the machine speed $V_b$.

In FIG. 5D, the planetary carrier assembly C has reached its 90° position and has accelerated its selected group of bottles from their initial infeed speed to the machine speed $V_b$ at which the group is delivered to subsequent stations of the packaging machine. Planetary carrier assembly E is seen approaching the bottle that it will engage in order to select and accelerate the next successive group of bottles. This process is repeated continuously to feed grouped bottles at the proper machine speed to downstream packaging stations of the packaging machine.

Figure 6:
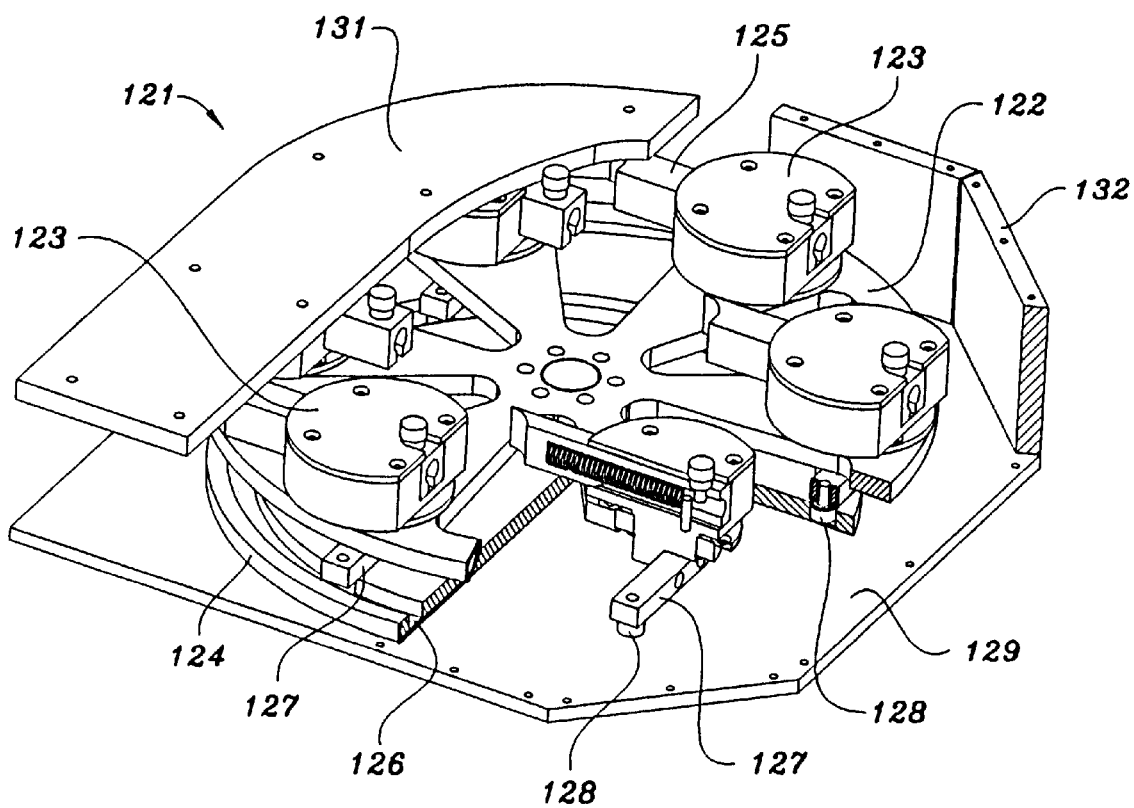
FIG. 6 is a perspective partially sectioned view of an alternate embodiment of this invention that includes an eccentric cam track in place of the eccentric ring of the embodiment shown in FIG. 1.

FIG. 6 illustrates an alternate embodiment of the article grouping assembly wherein an eccentric cam track replaces the rotating eccentric ring of FIG. 2. As with the previously described embodiment, the article grouping assembly 121 in FIG. 6 comprises a body plate 129 that supports a rotatable drive wheel 122. A set of planetary carrier assemblies 123 are rotatably mounted about the periphery of the drive wheel 122 and a cam plate 131 is provided for extending and retracting the fingers 125 of the planetary carrier assemblies 123. A side cover plate 132 is provided to enclose and protect the assembly. All of these elements are constructed and function in the same way as previously described with reference to the embodiment of FIGS. 1 through 5. Accordingly, a detailed description of these elements here is not necessary.

A cam disc 124 is secured to the body plate 129 beneath the drive wheel 122. A circular cam track 126 is machined in the cam plate 124. The cam track 126 is eccentrically positioned relative to the axis of rotation of the drive wheel 122. As with previously described embodiment, each of the planetary carrier assemblies 123 is provided with a laterally projecting arm 127 and a depending cam follower 128 is secured to the distal end of the arm. The cam follower 128 is sized and positioned to be received in the eccentric cam track 126 when its planetary carrier assembly is properly oriented on the drive wheel 122. Thus, as the drive wheel 122 rotates about its axis, the cam follower 128 of each planetary carrier assembly 123 rides in the eccentric cam track 126. In this way, the cam followers are constrained to a predetermined path of movement as the drive wheel rotates and, in turn, the planetary carrier assemblies 123 and their fingers 125 are maintained in a fixed orientation as they are carried around with the rotating drive wheel 122.

The cam disk 124 is illustrated in FIG. 6 as being circular in shape. However, this is not a requirement and the cam plate could in fact be formed in any desired configuration even though a circular shape is preferred. The cam plate, cam track, and cam follower arrangement illustrated in FIG. 6 offers certain advantages over the eccentric ring configuration of FIGS. 1 through 5 because it is simpler and has fewer moving parts subject to wear and failure. However, its function is the same; that is, to maintain the planetary carrier assemblies in a fixed orientation as they move around with the rotating drive wheel 122.

The invention has been described herein in terms of preferred embodiments and methodologies. It will be obvious to those of skill in the art, however, that various additions, deletions, and modifications might be made to the illustrated embodiments without departing from the spirit and scope of the invention as set forth in the claims.

I claim:

1. A method of selecting a predetermined number of articles from a plurality of articles and grouping the selected articles for packaging by an article packaging machine, said method comprising the steps of:

(a) moving the plurality of articles in series along a first path at a first rate of speed;

(b) positioning a rotatable selector wheel assembly along the first path, the selector wheel assembly having a drive wheel with a periphery disposed adjacent the first path and supporting at least one article engagement member being movable with the rotatable drive wheel;

(c) rotating the drive wheel in the direction of the first path at a predetermined rotation rate to move the article engagement member past the first path at a second rate of speed greater than the first rate of speed, the speed of the article engagement member having a velocity component in the direction of the first path that increases from zero to the second rate of speed as the article engagement member approaches the path of travel;

determining the location on the periphery of the drive wheel where the velocity component of the article engagement member in the direction of the path of travel is substantially equal to the first rate of speed; and diverting the series of articles from the first path to a second path as the articles are moved toward the selector wheel assembly so that the article engagement member engages selected ones of the articles along the second path at said determined location, the article engagement member accelerating the article to the second rate of speed as the selector wheel assembly continues to rotate.

2. A method of selecting a predetermined number of articles from a plurality of articles and grouping the selected articles into an ordered group for packaging by an article packaging machine, said method comprising the steps of:

(a) moving the plurality of articles in series progressively along a first path at a first rate of speed;

(b) disposing a rotatable selector wheel adjacent the first path, the selector wheel assembly supporting at least one selector finger;

(c) rotating the selector wheel assembly at a rate of rotation that is predetermined to move the selector finger past the first path at a second rate of speed greater than the first rate of speed wherein the selector finger remains substantially perpendicular to the first path of travel as the selector wheel is rotated and wherein the selector finger and the selector wheel move at a uniform speed during a complete rotation of the selector wheel; and (d) engaging selected ones of the articles with the selector finger at a location on the selector wheel where the velocity component of the selector finger in the direction of the first path is substantially equal to the first rate of speed to select the engaged article and accelerate it along a second path from the first rate of speed to the second rate of speed as the selector finger approaches the first path.

3. The method of claim 2 and wherein step (b) further comprises locating a plurality of selector fingers at spaced locations.

4. The method of claim 3 and wherein step (d) further comprises engaging selected ones of the articles with successive selector fingers to form the articles into successive groups as the articles are accelerated from the first rate of speed to the second rate of speed.

5. The method of claim 2 and wherein step (d) further comprises extending the selector finger from the selector wheel assembly as the selector finger moves along the first path to maintain engagement between the selector finger and a selected article for a distance along the first path.

6. A system for selecting a predetermined number of articles in a queue from a plurality of articles moving through an article packaging machine and grouping the selected articles for packaging, said system comprising;

a frame;

a meter assembly mounted on said frame for moving the plurality of articles along a path at a first rate of speed;

a rotatable selector wheel mounted on said frame, said selector wheel having a periphery and being mounted to said frame with said periphery disposed adjacent said path of travel;

a drive assembly for rotating said selector wheel at a rate of rotation predetermined to move said periphery of said selector wheel past said path at a second rate of speed greater than said first rate of speed;

at least one article engagement assembly mounted to said selector wheel, said article engagement assembly having a finger movable with said selector wheel as said selector wheel is rotated, the speed of said finger having a velocity component in the direction of said path of travel that increases progressively from zero to said second rate of speed as said finger is moved on said selector wheel toward said path; and a guide on said frame for directing the plurality of articles into engagement with said finger at a predetermined angular location adjacent said selector wheel where the velocity component of said finger in the direction of said path approximately equals said first rate of speed, selected ones of said articles being engaged by said finger and accelerated to said second rate of speed as said finger rotates toward and past said path of travel wherein said finger remains substantially fixed in relation to said path as said selector wheel rotates.

7. The system of claim 6 and further comprising a spring attached to said finger for extending said finger relative to said periphery of said selector wheel as said finger moves past said path, to extend the duration of contact between said finger and a selected article.

8. The system of claim 6 and wherein said meter assembly comprises at least one star wheel.

9. The system of claim 6 and wherein said guide is configured to divert said articles moving along said path toward said predetermined angular location on said selector wheel.

10. The system of claim 6 and wherein said meter assembly is configured to move said plurality of articles in side-by-side pairs along said path and wherein said system further comprises a pair of rotatable selector wheels disposed on opposite sides of said path for simultaneously selecting pairs of articles to group said articles in groups of even numbers of articles.

11. The system of claim 10 and wherein said meter assembly comprises a pair of rotating star wheels on either side of said path of travel.

12. The system of claim 11 and wherein said guide comprises a guide insert in said path for diverting said pairs of articles toward respective ones of said selector wheels.

13. The system of claim 6 and further comprising means for maintaining said article engagement assembly and said finger in a fixed orientation relative to said path as said article engagement assembly and said finger move with said selector wheel.

14. The system of claim 13 and wherein said means for maintaining comprises an arm projecting from said article engagement assembly to an end, a pin depending from said end of said arm, and means for confining said pin to a predetermined path of movement as said article engagement assembly moves with said selector wheel.

15. The system of claim 14 and wherein said means for confining comprises a rotatable eccentric ring having holes for receiving said pin of said arm.

16. The system of claim 14 and wherein said means for confining comprises an eccentric cam track position to receive and guide said pin of said arm as said article engagement assembly and said finger moves with said drive wheel.

* * * * *